April 8, 1952     G. F. HOLTZ ET AL     2,592,143
FISHING LINE WASHING AND DRYING APPARATUS
Filed Aug. 3, 1948
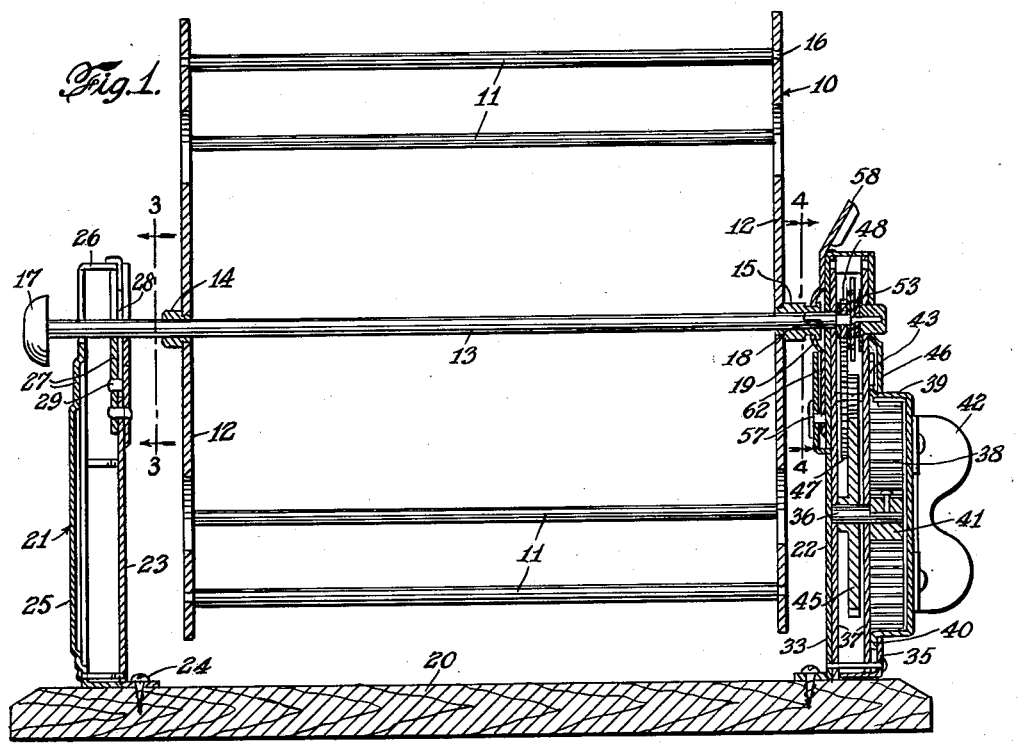
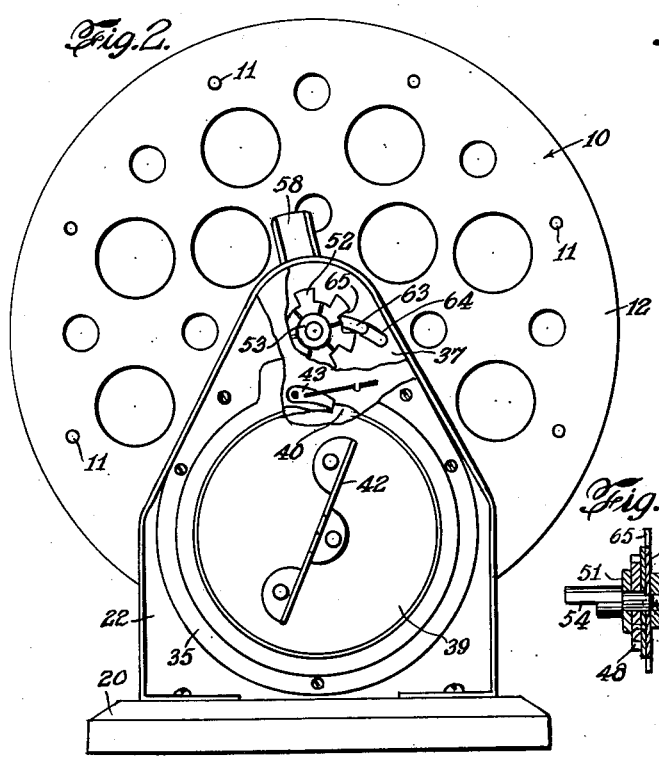
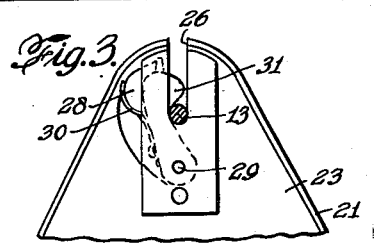
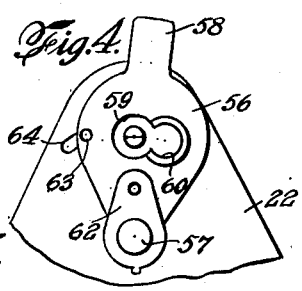
INVENTORS
GEORGE F. HOLTZ AND
SAM BERNSTEIN
BY
ATTORNEY.

UNITED STATES PATENT OFFICE 2,592,143

FISHING LINE WASHING AND DRYING APPARATUS

George Frederick Holtz, Brooklyn, N. Y., and Sam Bernstein, Oakland, Calif.

Application August 3, 1948, Serial No. 42,206

10 Claims. (Cl. 242—104)

The present invention relates to effective, compact and convenient apparatus for use in washing, drying and storing fishing lines and the like.

If a wet fishing line is left on the usual fishing reel after it has been used, it will rot or deteriorate in a relatively short time destroying the usefulness of the line entirely or seriously impairing its strength. The deterioration of the line is still greater and more rapid when the line has been used in salt water because of the salt coating left on the line.

In order to preserve the line, it is essential to wash it in clean fresh water and then dry it promptly after use. However, a fisherman is usually tired when he returns from a day's fishing and is inclined to neglect the washing and drying of his lines because of the time and effort required for this chore with presently available equipment.

It is an object of the present invention to provide simple, compact, convenient and effective apparatus with which the washing and drying of a fishing line can be done so quickly and with so little effort that it will not be neglected. Another object of the invention is to provide washing and drying apparatus which is highly flexible in its operation being capable of handling either long or short lines or even several lines at the same time. A further feature of the invention is that by using a series of interchangeable drying reels the lines can be left on the reels after drying thereby providing a convenient means of storing a number of lines. By storing the lines on the drying reels rather than tightly wound on the usual fishing reels, the life of the lines can be materially increased. Moreover, it frees the fishing reel for use with other lines making it unnecessary to have a large number of expensive fishing reels.

Most fishermen take a distinctive pride in their equipment and like to have equipment which is not only effective for its intended use but also is attractive in appearance. A further object of the invention is to provide fishing line washing and drying equipment of which even the most discerning fisherman can be justly proud.

In accordance with the present invention, a hollow reel on which the fishing line is wound for washing and drying is removably supported by spaced bearing supports mounted on a suitable frame or base. Driving mechanism associated with one of the supports is provided for rotating the removable reel to wind the fishing line off the usual fishing reel on to the drying reel. A simple and effective latch mechanism is provided for keeping the drying reel coupled with the driving mechanism while the reel is in use. When the latch is released to permit removal of the reel from the winding mechanism, the drive is automatically locked.

In the form of our invention herein shown and described, the power for rotating the drying reel is provided by a simple spring motor which is connected with the reel in such manner that the unwinding of a line from the reel automatically winds up the spring motor to provide power for subsequently winding the same or another line on the reel. A feature of the invention is that the latch mechanism referred to above permits removal of the reel from the winding mechanism without loss of any of the power stored in the spring motor. Hence a reel with a line wound on it can be taken off and removed for storage and another reel put in place on the winding mechanism.

While the spring motor is automatically rewound by the withdrawal of a line from the drying reel, provision is made for quickly and easily winding the spring by hand to provide additional power. This makes it possible to wind up a longer line than the one previously taken off the reel and also makes possible the reeling of several lines successively.

A further feature of the invention is that while rotation of the reel by the withdrawal of a line winds up the spring motor, the reel can still continue to be turned even after the spring is fully wound. It is hence possible to unreel the long line or a series of lines easily and quickly without any danger of jamming the driving mechanism.

In using the apparatus in accordance with the invention, the end of a fishing line is attached to the drying reel and the reel is thereupon rotated by the driving mechanism to draw the line off of the fishing reel and wind it in a single layer or relatively few layers on the larger hollow drying reel. The reel is then removed from the winding mechanism and dipped in a container of fresh water or held under a shower to wash off any salt or dirt on the line. It is then put back on the winding mechanism or in other suitable place to permit the line to dry. If desired, the reel can be spun by the winding mechanism to hasten the drying. A fisherman will usually find it convenient to have a plurality of drying reels which can be used interchangeably in the apparatus. Any fishing lines that are not in use can be conveniently stored on the extra drying reels and readily wound off on to a fishing reel whenever it is desired to use them.

Further objects and advantages of our invention will be understood from the following description and the accompanying drawings which show, by way of example, one embodiment of the invention.

In the drawings:

Fig. 1 is a vertical longitudinal central section of apparatus embodying the invention.

Fig. 2 is an end view taken from the right-hand end of Fig. 1 with certain portions of the casing broken away to show internal operating parts.

Fig. 3 is a fragmentary view taken approximately on the line 3—3 of Fig. 1.

Fig. 4 is a fragmentary view taken approximately on the line 4—4 of Fig. 1.

Fig. 5 is a detailed view taken on approximately the same plane as Fig. 1 but showing the driving shaft and friction drive on a larger scale.

The apparatus illustrated in the drawings comprises a hollow washing and drying reel and winding mechanism for removably supporting the reel including driving mechanism for rotating the reel and latch mechanism which is movable to one position to keep the reel coupled with the driving mechanism and to another position for releasing the reel to permit its removal while automatically locking the driving mechanism.

In the form shown in the drawings, the reel 10 comprises a circular or polygonal series of rods or bars 11 extending between two parallel circular plates 12 secured in spaced relation on a central shaft 13, for example, by collars 14 and 15. As shown in the drawings, the rods 11 are spaced inwardly a uniform distance from the peripheries of the discs 12. The ends of the rods 11 are secured to the discs 12 in a manner to provide a simple yet strong structure, for example, by reducing the diameter of the end portion of the rod to form a shoulder inserting the reduced end portion through a hole of corresponding diameter in the end plate and then peening or riveting the end of the rod as indicated at 16. One end of the shaft 13 projects beyond the end plate 12 and is provided with a knob 17. The other end is provided with a non-circular portion which is shown in the form of a short semi-cylindrical portion 18. The above-mentioned collar or bushing 15 extends approximately to the outer end of the semi-cylindrical portion of the shaft and is grooved to provide a flange or shoulder 19.

The winding mechanism comprises a base 20 on which are mounted a pair of spaced supporting members 21 and 22. The left-hand support 21 is made up of a sheet metal stamping 23 which is flanged and secured to the base by screws 24 and a second sheet metal stamping 25 which is flanged at its edges and secured to the stamping 23 so as to provide spaced approximately parallel portions. The upper edges of the members 23 and 25 are notched as indicated at 26 to receive the projecting end of the reel shaft 13. Notched bearing plates 27 are secured to the inner member 23 to provide a substantial bearing for the reel shaft. Between the bearing plates 27, there is provided a spring latch 28 which is pivoted at 29 and is provided with a spring 30 which tends to swing the latch about its pivot so as to cause a curved nose portion 31 to project into the notch 26 and hold the reel shaft releasably in the bearing provided by the notch.

The opposite support 22 is similar in configuration and appearance to the support 21 and comprises an inner member 33 and an outer member 35 which are of such configuration so that they can both be formed as metal stampings. Driving mechanism rotating the reel is provided between the members 33 and 35 and within a rotary housing associated with the outer member 35.

The driving mechanism includes a spring motor having a motor shaft 36 rotatably supported by spaced bearing plates 37 which are held between and approximately parallel to the inner and outer casing members 33 and 35. A spiral spring 38 such as a heavy duty clock spring is inclosed in a cup-shaped housing or barrel 39 which is concentric with the shaft 36 and is rotatably supported by extending through a circular hole in the outer supporting member 35 and having a flange 40 engaging the inner surface of the supporting member. One end of the spring 38 is secured to a bushing 41 on the shaft 36, while the other is attached to the inner periphery of the cup-shaped barrel 39. The barrel 39 can be rotated by a handle 42 in order to wind the spring and is held against unwinding by a spring pressed pawl 43 engaging teeth in the periphery of the inner flange 40 of the barrel.

A large gear 45 of the motor shaft 36 engages a pinion 46 on a counter shaft rotatably supported by the bearing plates 37 and carrying a second gear 47 meshing with a second pinion 48 (Figs. 1 and 5) on a driving shaft 50 which is rotatably supported in axial alignment with the bearing provided for the reel shaft by the support 21 (Fig. 1). The pinion 48 is rotatable relative to the driving shaft 50 but is held between a fixed flange or shoulder 51 and a spring washer 52 which is non-rotatable on the shaft and is pressed against the side of the pinion 48 by a nut 53 screwed on to a threaded portion of the shaft. This provides a spring friction drive between the pinion 48 and the shaft 50. On the side of the pinion 48 against which the friction disc 52 bears, there is preferably provided a flange or disc which is of greater diameter than the pinion and which is rotatable therewith. This provides a greater bearing surface for the friction disc 52.

The inner end of the driving shaft 50 projects beyond the inner supporting member 33 and has a flattened or semi-cylindrical end portion 54 which is adapted to project into the collar 15 (Fig. 1) of the reel and engage the correspondingly flattened end of the reel shaft 13 to provide a driving connection between the driving shaft 50 and the reel.

The reel is held in place and the driving connection with the shaft 50 is maintained by means of a latch member 56 (Figs. 1 and 4) which is pivotally connected to the supporting member 33 at 57 and has an upwardly projecting handle portion 58 for swinging it about its pivot. The latch member 56 has two interconnecting circular holes 59 and 60 so positioned that by pivotal movement of the latch member, either hole can be brought into axial alignment with the driving shaft 50. The hole 59 is of sufficiently large diameter to permit the passage of the flange 19 provided at the end of the collar 15 of the reel (Fig. 1). The other hole 60 is of slightly smaller diameter and its edges are preferably belled out as shown in Fig. 1.

With the latch member 56 swung to a position in which the larger hole 59 is concentric with the driving shaft 50, the reel 10 is placed in the winding mechanism by slipping the flanged end of the bushing 15 through the hole 59 and over the flattened end of driving shaft 50 so as to bring the flattened ends of the reel shaft and the driving shaft into engagement. The other end of the reel shaft 13 is pressed down in the notch 26 past the spring detent 28. The latch 56 is then swung in a counterclockwise direction as viewed in Fig. 4 to bring the hole 60 into alignment with the reel shaft and cause the edges of the hole to engage the flange 19 of the reel, thereby locking the reel against removal and securing it in driven relation with the shaft 50 and the driving mechanism. A spring detent 62 alternatively engaging spaced depressions or holes in the latch 56, resiliently holds the latch in either latched or unlatched position.

The latch member 56 carries a detent pin 63 which projects through a slot 64 in the inner supporting member 33 and is adapted to engage one or another of a series of notches 65 provided in the periphery of the spring disc 52 when the latch is in the position shown in Fig. 4, i.e., in its unlatched position. This holds the disc 52 against rotation and locks the driving mechanism so as to hold the power of the spring motor even if the reel is removed. Movement of the latch member to its other position disengages the detent 63 from the washer 52 and frees the driving mechanism. Hence in one position the latch member 56 locks the reel against removal from the winding mechanism and maintains the coupling between the reel and the driving shaft 50, while at the same time releasing the driving mechanism so that it will either rotate the reel to wind a line on to the reel or will permit the winding of the spring motor by rotation of the reel in the opposite direction to unwind a line. In another position, the latch 56 frees the reel so that it can be removed from the winding mechanism and at the same time locks the driving mechanism so as to hold the power of the spring. If desired, the latch can by being in an intermediate position retain the reel against removal while at the same time locking the driving mechanism.

While the invention has been shown and described with reference to a particular embodiment, it will be understood by those skilled in the art that it is not limited to this particular embodiment but may be modified or varied within the scope of the appended claims.

The invention thus provides greatly improved apparatus for washing and drying fishing lines and the like which is simple in construction, compact in size, convenient to use and attractive in appearance.

We claim:

1. Fish line washing and drying apparatus comprising a base, aligned bearings supported by the base, a hollow reel comprising a shaft removably supported by the bearings, a latch for holding the reel against removal, spring actuated driving mechanism for rotating the reel, driving means between said driving mechanism and said shaft means for locking the driving mechanism and a unitary control member for said latch and locking means operable to lock the driving mechanism when the latch is released to permit removal of the reel, said driving means comprising a driving shaft having abutment means thereon, a pinion rotatably mounted on said driving shaft and adjustable friction means for urging said pinion into frictional engagement with said abutment means, whereby to provide a friction clutch between said pinion and said driving shaft.

2. Fish line washing and drying apparatus comprising a base, aligned bearings supported by the base, a reel including a shaft removably supported by the bearings, spring actuated driving mechanism for rotating the reel, driving means between said driving mechanism and said shaft, a latch for holding the reel against removal and a locking detent carried by said latch for locking the driving mechanism when the latch is released, said driving means comprising a driving shaft having abutment means thereon, a pinion rotatably mounted on said driving shaft and adjustable friction means for urging said pinion into frictional engagement with said abutment means, whereby to provide a friction clutch between said pinion and said driving shaft.

3. Fish line washing and drying apparatus comprising a rotatably supported driving shaft, spring actuated mechanism for rotating said shaft, a reel including a shaft, means for releasably coupling one end of the reel shaft with the driving shaft, means for rotatably supporting the opposite end of the reel shaft and means for stopping the driving mechanism upon release of said coupling means to permit removal of the reel, said driving shaft being provided with abutment means, a pinion rotatably mounted on said driving shaft and adjustable friction means for urging said pinion into frictional engagement with said abutment means, whereby to provide a friction clutch between said pinion and said driving shaft.

4. Fish line washing and drying apparatus comprising a rotatably supported driving shaft, driving mechanism for rotating said shaft, a reel including a shaft provided with an annular shoulder adjacent one end thereof, a latch engaging said shoulder to hold the adjacent end of the reel shaft in driving relation with the driving shaft, means for rotatably supporting the other end of the reel shaft and means actuated by the latch to stop the driving mechanism when the latch is released to permit removal of the reel, said driving shaft being provided with abutment means, a pinion rotatably mounted on said driving shaft and adjustable friction means for urging said pinion into frictional engagement with said abutment means, whereby to provide a friction clutch between said pinion and said driving shaft.

5. In fish line washing and drying apparatus the combination with a pair of spaced supports, of a driving member rotatably supported by one of the supports, a reel including shaft portions projecting from opposite ends thereof, the driving member and one of said shaft portions being provided with interengaging torque transmitting portions, a latch member associated with the last mentioned support and having a latch portion for releasably holding the reel in driven connection with the driven member and a detent portion for locking the driving mechanism when the reel is released, said driving member being actuated by a spring actuated driving mechanism and comprising a driving shaft having abutment means thereon, a pinion rotatably mounted on said driving shaft and adjustable friction means for urging said pinion into frictional engagement with said abutment means, whereby to provide a friction clutch between said pinion and said driving shaft.

6. In fish line washing and drying apparatus the combination with a reel including a shaft, of spaced supports for releasably supporting the reel for rotation about its axis, driving mechanism associated with one of said supports for rotating the reel, a unitary latch member mounted on the last mentioned support and movable between a position in which it locks the reel in driving relationship with the driving member and turns on the driving mechanism and a position in which it stops the driving mechanism and releases the reel for removal from the supports, and a driving shaft engageable with said reel shaft, said driving shaft being actuated by said driving mechanism and being provided with abutment means, a pinion rotatably mounted on said driving shaft and adjustable friction means for urging said pinion into frictional engagement with said abutment means, whereby to provide a friction clutch between said pinion and said driving shraft.

7. In fish line washing and drying apparatus, the combination with a reel of spaced supports, a bearing provided on one of the supports for rotatably supporting one end of the reel, means for releasably retaining said end of the reel in the support, a driving member rotatably supported by the other support, driving mechanism for rotating the driving member, and a latch member for releasably holding the other end of the reel in driven relation with the driving member and for stopping the driving mechanism upon release of the reel from the driving member, said driving member comprising a driving shaft having abutment means thereon, a pinion rotatably mounted on said driving shaft and adjustable friction means for urging said pinion into frictional engagement with said abutment means, whereby to provide a friction clutch between said pinion and said driving shaft.

8. In fish line washing and drying apparatus, the combination with a reel including a shaft, of spaced supports for releasably supporting the reel for rotation about its axis, a driving member rotatably supported by one of said supports, driving mechanism including a motor for rotating the driving member, and a latch member associated with the last mentioned support and movable between a position in which it locks the reel in driving relation with the driving member and a position in which it releases the reel and locks the driving mechanism, said driving member including a driving shaft engageable with the shaft of said reel, said driving shaft being provided with abutment means, a pinion rotatably mounted on said driving shaft and adjustable friction means for urging said pinion into frictional engagement with said abutment means, whereby to provide a friction clutch between said pinion and said driving shaft.

9. Fish line washing and drying apparatus comprising a reel including a shaft, spaced supports for releasably supporting the reel for rotation, a driving member rotatably supported by one of said supports, said driving member having a shaft engageable with the shaft of said reel, latch means for releasably holding the reel in coupled relation with the driving member for rotation therewith, a spring motor, reversible driving connections including a friction drive included in said driving member, means for winding the motor when the driving member is stationary and means associated with said latch for holding the power of the motor when the latch is released to permit removal of the reel, said friction drive comprising a pinion rotatably mounted upon the shaft of said driving member and adjustable friction means for urging said pinion into frictional engagement with said shaft, whereby to provide a friction clutch between said pinion and said driving member shaft.

10. Fish line washing and drying apparatus comprising a reel including a shaft, a pair of spaced supports for releasably supporting the reel for rotation, a driving member rotatably supported by one of the supports and having a shaft engageable with the shaft of said reel, means for releasably coupling the reel in driven relation with the driving member, a motor shaft rotatably supported by the last mentioned support, a rotatable cup-shaped housing concentric with the motor shaft, means for releasably holding the housing against rotation, a spiral spring enclosed in the housing and having one end connected with the housing and the other end connected with the motor shaft, a driving connection including a friction clutch between the motor shaft and the shaft of the driving member and means associated with the driving connection on the motor side of the friction drive for holding the motor power when said coupling is released to permit removal of the reel, said friction clutch comprising a pinion rotatably mounted on said driving member shaft and adjustable friction means for urging said pinion into engagement with said driving member shaft, whereby to provide a friction clutch between said pinion and said driving member shaft.

GEORGE FREDERICK HOLTZ.
SAM BERNSTEIN.

REFERENCES CITED

The following references are of record in the file of this patent:

UNITED STATES PATENTS

| Number | Name | Date |
| --- | --- | --- |
| Re. 11,067 | Griswold | Mar. 18, 1890 |
| 886,690 | Fowle | May 5, 1908 |
| 962,099 | Reinhart et al. | June 21, 1910 |
| 1,625,343 | Van Nostrand | Apr. 19, 1927 |
| 2,007,050 | Hirschmann | July 2, 1935 |
| 2,145,474 | Burdick | Jan. 31, 1939 |